US008688457B2

(12) United States Patent
Dewa et al.

(10) Patent No.: US 8,688,457 B2
(45) Date of Patent: Apr. 1, 2014

(54) TRANSMITTING APPARATUS, TRANSMITTING METHOD, RECEIVING APPARATUS, RECEIVING METHOD, COMPUTER PROGRAM, AND BROADCASTING SYSTEM

(75) Inventors: Yoshiharu Dewa, Tokyo (JP); Ichiro Hamada, Tokyo (JP)

(73) Assignee: Sony Corporation, Tokyo (JP)

( * ) Notice: Subject to any disclaimer, the term of this patent is extended or adjusted under 35 U.S.C. 154(b) by 739 days.

(21) Appl. No.: 12/905,295

(22) Filed: Oct. 15, 2010

(65) Prior Publication Data

US 2011/0096232 A1 Apr. 28, 2011

(30) Foreign Application Priority Data

Oct. 22, 2009 (JP) ................ P2009-243442

(51) Int. Cl.
*G10L 21/00* (2013.01)
(52) U.S. Cl.
USPC ........... 704/271; 704/270; 715/203; 715/825; 345/163; 345/169
(58) Field of Classification Search
USPC ........... 704/271, 270; 715/203, 825; 345/163, 345/169
See application file for complete search history.

(56) References Cited

U.S. PATENT DOCUMENTS

| | | | |
|---|---|---|---|
| 5,890,120 A * | 3/1999 | Haskell et al. ............ | 704/271 |
| 6,377,925 B1 * | 4/2002 | Greene et al. ............. | 704/271 |
| 6,460,056 B1 * | 10/2002 | Horii ...................... | 715/203 |
| 7,076,429 B2 * | 7/2006 | Basson et al. ............ | 704/272 |
| 2002/0140718 A1 * | 10/2002 | Yan et al. ................. | 345/706 |
| 2002/0161582 A1 * | 10/2002 | Basson et al. ............ | 704/260 |
| 2005/0033578 A1 * | 2/2005 | Zuckerman .............. | 704/271 |
| 2009/0012788 A1 | 1/2009 | Gilbert | |
| 2010/0131900 A1 * | 5/2010 | Spetalnick ............... | 715/825 |

FOREIGN PATENT DOCUMENTS

| | | |
|---|---|---|
| JP | 8-322000 | 12/1996 |
| WO | WO 98-53438 | 11/1998 |

OTHER PUBLICATIONS

R. San-Segundo, et al., "Speech to Sign Language Translation System for Spanish", Science Direct, Speech Communication 50, pp. 1009-1020, (2008).

European search report dated Jan. 14, 2011, from the European Patent Office in corresponding European Application No. EP 10 17 2821.

* cited by examiner

*Primary Examiner* — Vijay B Chawan
(74) *Attorney, Agent, or Firm* — Sherr & Jiang, PLLC

(57) ABSTRACT

The transmitting apparatus includes an encoder creating an encoded content signal by encoding the content, a generator generating sign language word identification information corresponding to chronologically-ordered sign language words appearing in a speech in the content, a creating unit creating control information containing the generated chronologically-ordered sign language word identification information, a storage unit storing sign language word images for displaying a sign language video corresponding to the sign language words by grouping the sign language word images into a plurality of modules according to a frequency of appearance of the sign language words in the speech in the content, a multiplexer creating a data stream by combining the encoded content signal with the control information and by repeatedly replicating the plurality of modules at a frequency corresponding to the frequency of appearance, and a transmitter transmitting the created data stream.

17 Claims, 11 Drawing Sheets

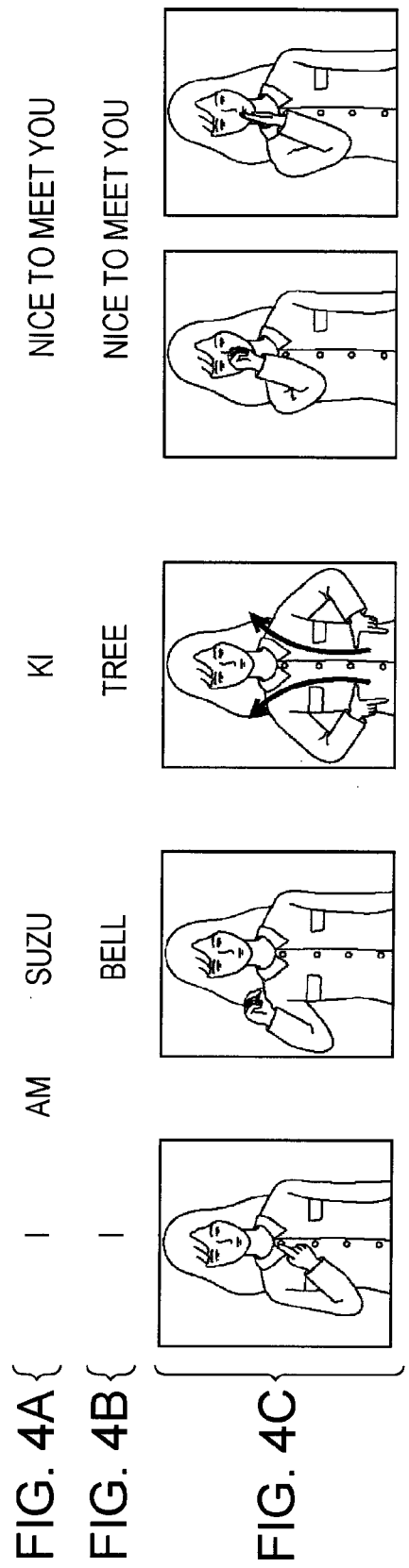

FIG. 5

TV PROGRAM X →TIME

| DATA CAROUSEL MODULE A | DATA CAROUSEL MODULE B | DATA CAROUSEL MODULE A | DATA CAROUSEL MODULE C | DATA CAROUSEL MODULE A | DATA CAROUSEL MODULE B |
|---|---|---|---|---|---|
| SIGN LANGUAGE WORD A1 | SIGN LANGUAGE WORD B1 | SIGN LANGUAGE WORD A1 | SIGN LANGUAGE WORD C1 | SIGN LANGUAGE WORD A1 | SIGN LANGUAGE WORD B1 |
| SIGN LANGUAGE WORD A2 | SIGN LANGUAGE WORD B2 | SIGN LANGUAGE WORD A2 | SIGN LANGUAGE WORD C2 | SIGN LANGUAGE WORD A2 | SIGN LANGUAGE WORD B2 |
| SIGN LANGUAGE WORD A3 | SIGN LANGUAGE WORD B3 | SIGN LANGUAGE WORD A3 | SIGN LANGUAGE WORD C3 | SIGN LANGUAGE WORD A3 | SIGN LANGUAGE WORD B3 |
| SIGN LANGUAGE WORD A4 | SIGN LANGUAGE WORD B4 | SIGN LANGUAGE WORD A4 | SIGN LANGUAGE WORD C4 | SIGN LANGUAGE WORD A4 | SIGN LANGUAGE WORD B4 |
| ... | ... | ... | ... | ... | ... |

TRANSMITTING APPARATUS, TRANSMITTING METHOD, RECEIVING APPARATUS, RECEIVING METHOD, COMPUTER PROGRAM, AND BROADCASTING SYSTEM

BACKGROUND OF THE INVENTION

1. Field of the Invention

The present invention relates to a transmitting apparatus, transmitting method, receiving apparatus, receiving method, computer program, and broadcasting system, and in particular to a transmitting apparatus, transmitting method, receiving apparatus, receiving method, computer program, and broadcasting system that enable sign language interpretation to be additionally displayed on a screen of a television or the like.

2. Description of the Related Art

To help people with hearing difficulties to understand content of television programs, there have been methods using captions, sign language interpretation, or the like.

The caption-based method transmits caption data corresponding to aural data, or a speech in a television program using a data broadcasting signal (referred to below as a data signal) and allows the user of a television set to display or hide the captions as desired (refer to Japanese Unexamined Patent Application Publication No. 8-322000, for example).

The sign language interpretation-based method is employed in news programs targeted to people with hearing difficulties as well as campaign programs during elections, but the programs using sign language interpretation are extremely outnumbered by the programs using captions.

It is expected however that, from the viewpoint of universal access or the like, the use of the sign language interpretation-based method will be promoted in more television programs including commercial messages (CMs), hereinafter a program is also referred to as a content, under the leadership of the government.

In such a case, it would be impractical and difficult to have a sign language interpreter attend in each content. A video of the sign language interpreter (referred to below as a sign language video) would be created separately from the content.

It is expected that the created content and corresponding sign language video will be broadcast at the same time and will be displayed simultaneously by the receiving apparatus (television set, for example), or otherwise will be combined at the broadcasting station before being broadcast.

SUMMARY OF THE INVENTION

Displaying a content video and corresponding sign language video at the same time (for example, picture-in-picture display) would impose a heavy processing burden on the receiving apparatus and increase its manufacturing cost.

On the other hand, if the content video and corresponding sign language video are combined at the broadcasting station before being broadcast, the reproduced content video will be partially covered by the sign language video being unnecessary for hearing people. Furthermore, since the video of some contents including movies is not permitted to be combined with another video (in this case, sign language video), it is difficult to combine the two videos at the broadcasting station before broadcasting them.

It is desirable to broadcast a content video and corresponding sign language video separately from each other and then combine and display the content video with the corresponding sign language video on the receiving side without imposing a heavy processing burden on the receiving side.

According to an embodiment of the present invention, a transmitting apparatus configured to transmit a content includes encoding means for creating an encoded content signal by encoding the content, generating means for generating sign language word identification information corresponding to the chronologically-ordered sign language words appearing in a speech in the content, creating means for creating control information containing the generated chronologically-ordered sign language word identification information, storing means for storing sign language word images for displaying a sign language video corresponding to the sign language words by grouping the sign language word images into a plurality of modules according to a frequency of appearance of the sign language words in the speech in the content, multiplexing means for creating a data stream by combining the encoded content signal with the control information and by repeatedly replicating the plurality of modules at a frequency corresponding to the frequency of appearance; and transmitting means for transmitting the created data stream.

The creating means can create a DSM-CC event message as the control information containing the generated chronologically-ordered sign language word identification information. The storing means can store the sign language word images for displaying the sign language video corresponding to the sign language words by grouping the sign language word images into a plurality of DSM-CC data carousel modules according to the frequency of appearance of the sign language words in the speech in the content.

The generating means can include speech recognizing means for converting the speech in the content into a character string through a speech recognition process, detecting means for detecting the sign language words in the character string, and converting means for converting the detected sign language words into sign language word identification information.

According to the embodiment of the present invention, the transmitting apparatus can further include operation input means operated by an operator viewing the content and recognizing the sign language words contained in a speech in the content. The generating means can generate, on the basis of the operator's input to the operation input means, the sign language word identification information corresponding to the chronologically-ordered sign language words appearing in the speech in the content.

The multiplexing means can replicate the plurality of modules storing common sign language word images corresponding to sign language words frequently appearing in speeches of different contents for the encoded content signals corresponding to the different contents.

The sign language word images may be in the MNG, PNG, or JPEG format.

In the embodiment of the present invention, a transmitting method for transmitting a content from the transmitting apparatus includes the steps of creating an encoded content signal by encoding the content, generating sign language word identification information corresponding to the chronologically-ordered sign language words appearing in a speech in the content, creating control information containing the generated chronologically-ordered sign language word identification information, storing sign language word images for displaying a sign language video corresponding to the sign language words by grouping the sign language word images into a plurality of modules according to a frequency of appearance of the sign language words in the speech in the content, creating a data stream by combining the encoded content signal with the control information and by repeatedly replicating the plurality of modules at a frequency corresponding to the frequency of appearance, and transmitting the created data stream.

In the embodiment of the present invention, a computer program for controlling the transmitting apparatus configured to transmit a content causes a computer in the transmitting apparatus to execute a process including the steps of creating an encoded content signal by encoding the content, generating sign language word identification information corresponding to the chronologically-ordered sign language words appearing in a speech in the content, creating control information containing the generated chronologically-ordered sign language word identification information, storing sign language word images for displaying a sign language video corresponding to the sign language words by grouping the sign language word images into a plurality of modules according to a frequency of appearance of the sign language words in the speech in the content, creating a data stream by combining the encoded content signal with the control information and by repeatedly replicating the plurality of modules at a frequency corresponding to the frequency of appearance, and transmitting the created data stream.

In the embodiment of the present invention, the content is encoded to create an encoded content signal, sign language word identification information corresponding to the chronologically-ordered sign language words appearing in the speech in the content is generated, and control information containing the generated chronologically-ordered sign language word identification information is created. In addition, the sign language word images for displaying the sign language video corresponding to the sign language words are grouped according to the frequency of appearance of the sign language words in the speech in the content and stored into a plurality of modules, the encoded content signal is combined with the control information, the plurality of modules are repeatedly replicated at a frequency corresponding to the frequency of appearance to create a data stream, and the created data stream is transmitted.

According to another embodiment of the present invention, for receiving a content transmitted from a transmitting apparatus including encoding means for creating an encoded content signal by encoding the content, generating means for generating sign language word identification information corresponding to the chronologically-ordered sign language words appearing in a speech in the content, creating means for creating control information containing the generated chronologically-ordered sign language word identification information, storing means for storing sign language word images for displaying a sign language video corresponding to the sign language words by grouping the sign language word images into a plurality of modules according to a frequency of appearance of the sign language words in the speech in the content, multiplexing means for creating a data stream by combining the encoded content signal with the control information and by repeatedly replicating the plurality of modules at a frequency corresponding to the frequency of appearance, and transmitting means for transmitting the created data stream, a receiving apparatus includes receiving means for receiving the data stream transmitted from the transmitting apparatus, separating means for separating the received data stream into the encoded content signal, the control information, and the plurality of modules, decoding means for reproducing video and audio signals of the content by decoding the encoded content signal separated from the data stream, holding means for holding the sign language word images for displaying the video corresponding to the sign language words stored in the plurality of modules separated from the data stream, reading means for reading out of the sign language word images being held the sign language word images corresponding to the chronologically-ordered sign language word identification information contained in the control information separated from the data stream, and display controlling means for superimposing the sign language video based on the read sign language word images on the displayed content video based on the video signal of the reproduced content.

According to the embodiment of the present invention, for receiving a content transmitted from a transmitting apparatus including encoding means for creating an encoded content signal by encoding the content, generating means for generating sign language word identification information corresponding to the chronologically-ordered sign language words appearing in a speech in the content, creating means for creating control information containing the generated chronologically-ordered sign language word identification information, storing means for storing sign language word images for displaying a sign language video corresponding to the sign language words by grouping the sign language word images into a plurality of modules according to a frequency of appearance of the sign language words in the speech in the content, multiplexing means for creating a data stream by combining the encoded content signal with the control information and by repeatedly replicating the plurality of modules at a frequency corresponding to the frequency of appearance, and transmitting means for transmitting the created data stream, a receiving method of the receiving apparatus includes the steps of receiving the data stream transmitted from the transmitting apparatus, separating the received data stream into the encoded content signal, the control information, and the plurality of modules, reproducing video and audio signals of the content by decoding the encoded content signal separated from the data stream, holding the sign language word images for displaying the video corresponding to the sign language words stored in the plurality of modules separated from the data stream, reading out of the sign language word images being held the sign language word images corresponding to the chronologically-ordered sign language word identification information contained in the control information separated from the data stream, and superimposing the sign language video based on the read sign language word images on the displayed content video based on the video signal of the reproduced content.

According to the embodiment of the present invention, for receiving a content transmitted from a transmitting apparatus including encoding means for creating an encoded content signal by encoding the content, generating means for generating sign language word identification information corresponding to the chronologically-ordered sign language words appearing in a speech in the content, creating means for creating control information containing the generated chronologically-ordered sign language word identification information, storing means for storing sign language word images for displaying a sign language video corresponding to the sign language words by grouping the sign language word images into a plurality of modules according to a frequency of appearance of the sign language words in the speech in the content, multiplexing means for creating a data stream by combining the encoded content signal with the control information and by repeatedly replicating the plurality of modules at a frequency corresponding to the frequency of appearance, and transmitting means for transmitting the created data stream, a computer program for controlling the receiving apparatus causes a computer in the receiving apparatus to execute a process including the steps of receiving the data stream transmitted from the transmitting apparatus, separating the received data stream into the encoded content signal, the control information, and the plurality of modules, reproducing video and audio signals of the content by decoding the encoded content signal separated from the data stream, holding sign language word images for displaying the video corresponding to the sign language words stored in the plurality of modules separated from the data stream, reading out of the sign language word images being held the sign language word images corresponding to the chronologically-ordered sign language word identification information contained in the control information separated from the data stream, and superimposing the sign language video based on the read sign language word images on the displayed content video based on the video signal of the reproduced content.

According to the embodiment of the present invention, the data stream transmitted by the transmitting apparatus is received and separated into an encoded content signal, control information, and plurality of modules. The encoded content signal is decoded and thus the video and audio signals of the content are reproduced, the sign language word images for displaying the video corresponding to the sign language words stored in the plurality of modules are held, the sign language word image corresponding to the chronologically-ordered sign language word identification information contained in the control information is read out of the sign language word images being held, the sign language video based on the read sign language word images is superimposed on the displayed content video based on the reproduced content video signal.

According to still another embodiment of the present invention, a broadcasting system includes a transmitting apparatus configured to transmit a content and a receiving apparatus configured to receive the transmitted content. The transmitting apparatus includes encoding means for creating an encoded content signal by encoding the content, generating means for generating sign language word identification information corresponding to the chronologically-ordered sign language words appearing in a speech in the content, creating means for creating control information containing the generated chronologically-ordered sign language word identification information, storing means for storing sign language word images for displaying a sign language video corresponding to the sign language words by grouping the sign language word images into a plurality of modules according to a frequency of appearance of the sign language words in the speech in the content, multiplexing means for creating a data stream by combining the encoded content signal with the control information and by repeatedly replicating the plurality of modules at a frequency corresponding to the frequency of appearance, and transmitting means for transmitting the created data stream. The receiving apparatus includes receiving means for receiving the data stream transmitted from the transmitting apparatus, separating means for separating the received data stream into the encoded content signal, the control information, and the plurality of modules, decoding means for reproducing video and audio signals of the content by decoding the encoded content signal separated from the data stream, holding means for holding sign language word images for displaying the video corresponding to the sign language words stored in the plurality of modules separated from the data stream, reading means for reading out of the sign language word images being held the sign language word images corresponding to the chronologically-ordered sign language word identification information contained in the control information separated from the data stream, and display controlling means for superimposing the sign language video based on the read sign language word images on the displayed content video based on the reproduced content video signal.

According to the embodiment of the present invention, the transmitting apparatus creates an encoded content signal by encoding a content, generates sign language word identification information corresponding to the chronologically-ordered sign language words appearing in a speech in the content, and creates control information containing the generated chronologically-ordered sign language word identification information. The sign language word images for displaying the sign language video corresponding to the sign language words are grouped and stored into a plurality of modules according to the frequency of appearance of the sign language words in the speech in the content, the encoded content signal is combined with the control information, the plurality of modules are repeatedly replicated at a frequency corresponding to the frequency of appearance to create a data stream, and the created data stream is transmitted. The receiving apparatus in turn receives the data stream transmitted from the transmitting apparatus and separates the received data stream into the encoded content signal, the control information, and the plurality of modules. The encoded content signal is decoded and thus the video signal and audio signal of the content are reproduced, the sign language word images for displaying the video corresponding to the sign language words stored in the plurality of modules are held, the sign language word images corresponding to the chronologically-ordered sign language word identification information contained in the control information are read out of the sign language word images being held, the sign language video based on the read sign language word image is superimposed on the displayed content video based on the reproduced content video signal.

According to the embodiment described first, the control information and the sign language word images for displaying the sign language video corresponding to the content can be transmitted without being combined with each other.

According to the embodiment described second, the user can combine and simultaneously display the sign language video with the content video as desired.

According to the embodiment described third, the receiving apparatus can combine and display the sign language video with the corresponding content video, if the user of the receiving apparatus so desires, on the basis of the control information and the sign language word images for displaying the sign language video broadcast without being combined with the corresponding content video.

BRIEF DESCRIPTION OF THE DRAWINGS

FIGS. 4A to 4C illustrate a process for obtaining sign language word identification information from a speech;

FIG. 5 illustrates an exemplary configuration of data carousel modules;

DESCRIPTION OF THE PREFERRED EMBODIMENTS

The best mode (referred to below as embodiment) for carrying out the invention will now be described in detail with reference to the accompanying drawings.

1. Embodiments

[Exemplary Configuration of Broadcasting System]

Figure 1:
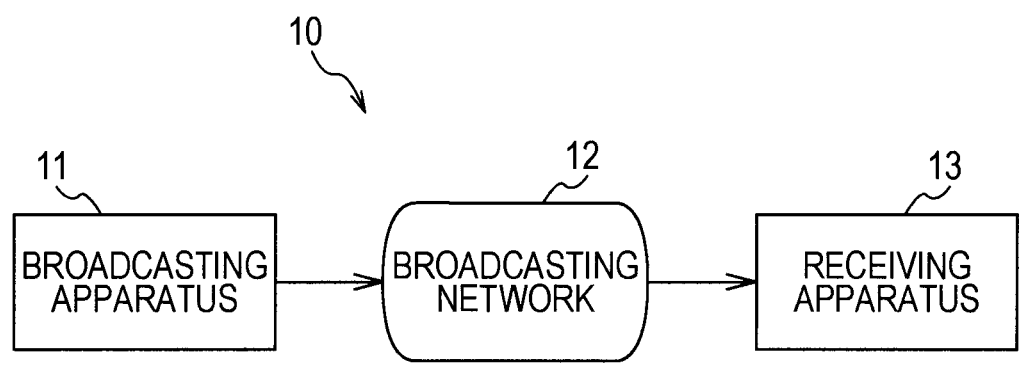
FIG. 1 is a block diagram showing an exemplary configuration of the broadcasting system according to an embodiment of the present invention.

FIG. 1 illustrates an exemplary configuration of the broadcasting system according to an embodiment of the present invention. The broadcasting system 10 includes a broadcasting apparatus 11 for broadcasting contents through a broadcasting network 12, and a receiving apparatus 13 for receiving the contents broadcast through the broadcasting network 12.

The broadcasting apparatus 11 is, for example, an apparatus provided in a television broadcasting station. The broadcasting apparatus 11 creates a broadcast stream by combining video and audio signals (referred to below as a content signal) of a content (such as a television program and CM) with a signal for displaying a sign language video corresponding to the content and broadcasts the created broadcast stream through the broadcasting network 12.

Examples of the broadcasting network 12 include terrestrial broadcasting networks, satellite broadcasting networks, CATV networks, and data communication networks represented by the Internet.

The receiving apparatus 13 receives the broadcast stream broadcast through the broadcasting network 12 and extracts and reproduces the content signal from the broadcast stream to obtain the video and the speech. The receiving apparatus 13 also extracts the signal for displaying the sign language video corresponding to the content from the broadcast stream and generates the sign language video.

Figure 2:
FIG. 2 illustrates an example of a displayed sign language video combined with a content video.

The receiving apparatus 13 superimposes the sign language video 22 on the content video 21 at a predetermined position as shown in FIG. 2 and outputs the combined images, together with the speech, to a monitor (not shown, television set, for example) at the subsequent stage.

The receiving apparatus 13 may be built in a television set or a video recorder, for example.

[First Exemplary Configuration of Broadcasting Apparatus]

Figure 3:
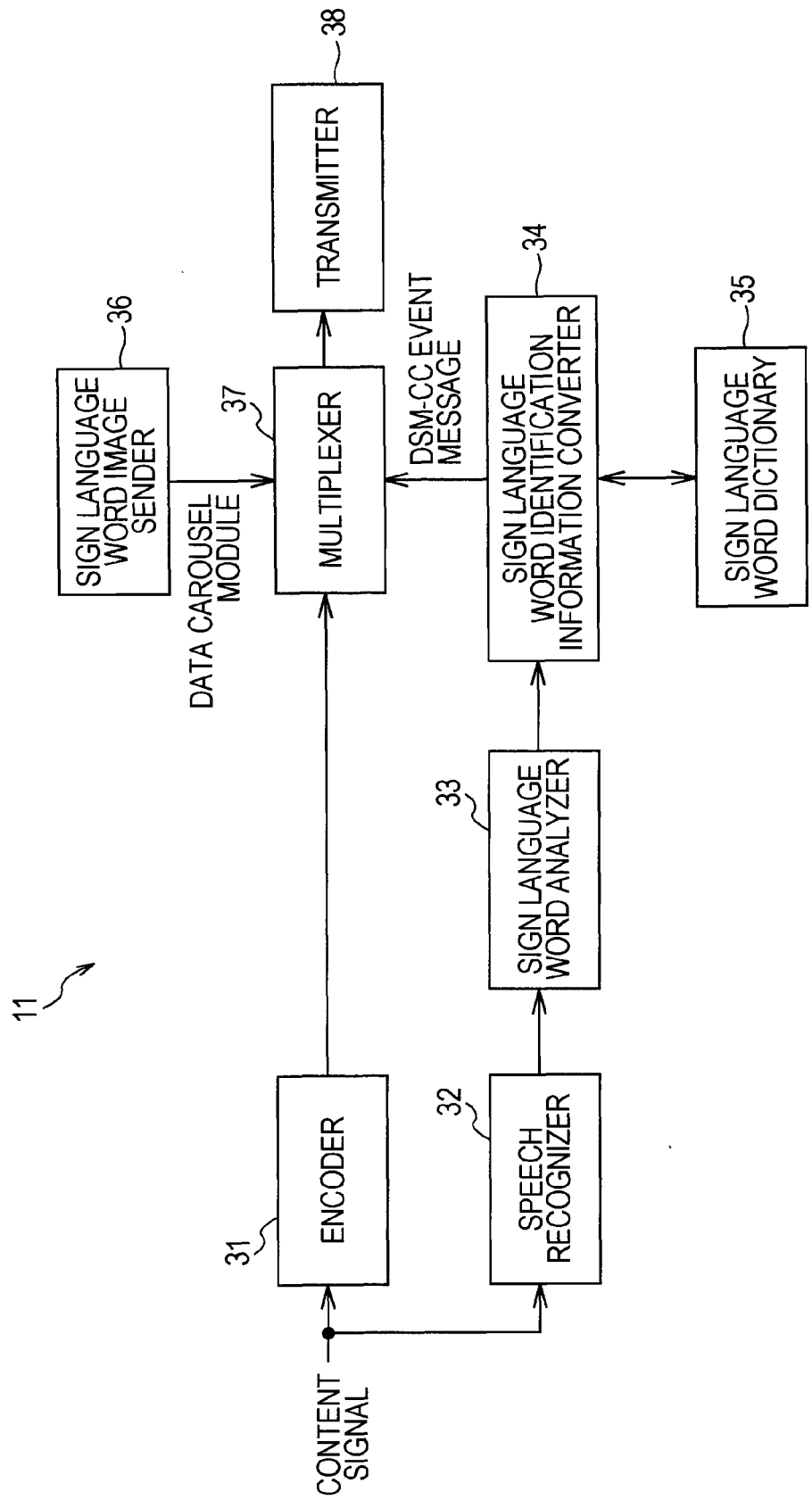
FIG. 3 is a block diagram showing a first exemplary configuration of the transmitting apparatus.

FIG. 3 illustrates the first exemplary configuration of the broadcasting apparatus 11. The broadcasting apparatus 11 in the first exemplary configuration includes an encoder 31, speech recognizer 32, sign language word analyzer 33, sign language word identification information converter 34, sign language word dictionary 35, sign language word image sender 36, multiplexer 37, and transmitter 38.

The encoder 31 encodes an input content signal (video and audio signals of a content) according to a predetermined encoding scheme and outputs the encoded content signal to the multiplexer 37.

The speech recognizer 32 carries out a speech recognition process on the audio signal of the input content signal and outputs the resulting character string as in FIG. 4A to the sign language word analyzer 33.

The sign language word analyzer 33 analyzes the character string input from the speech recognizer 32, decomposes the character string into sign language words as shown in FIG. 4B, and outputs the decomposed sign language words in the chronological order to the sign language word identification information converter 34.

The sign language word identification information converter 34 converts the sign language words sequentially input from the sign language word analyzer 33 into sign language word identification information by referring to the sign language word dictionary 35. The sign language word identification information converter 34 then outputs the resultant sign language word identification information, synchronously with the corresponding speech, to the multiplexer 37 as a DSM-CC event message for data broadcasting in the television broadcasting.

In the sign language word dictionary 55, sign language word identification information for uniquely identifying each sign language word is stored together with the corresponding sign language word.

The sign language word image sender 36, which is holding sign language word images corresponding to the sign language words as shown in FIG. 4C, for example, arranged in groups according to the category of each content or the frequency of appearance, stores the sign language word image groups corresponding to the content to be broadcast into data carousel modules for data broadcasting in the television broadcasting, and repeatedly outputs the data carousel modules to the multiplexer 37 in the predetermined order. Details will be described later with reference to FIG. 5.

It is assumed here that each sign language word image is an animation image created in the MNG (multiple-image network graphics) format for data broadcasting. Alternatively, the sign language word images may be in the PNG (portable network graphics) or JPEG (joint photographic experts group) format. Alternatively, the sign language word images may be created by photographing a real sign language interpreter or may be drawn by computer graphics or the like.

The multiplexer 37 combines the encoded content signal input from the encoder 31, the DSM-CC event message containing chronologically-ordered sign language word identification information input from the sign language word identification information converter 34, and the data carousel modules storing the sign language word image groups input from the sign language word image sender 36, and outputs the resultant broadcast stream to the transmitter 38.

The transmitter 38 broadcasts the broadcast stream input from the multiplexer 37 through the broadcasting network 12.

[Exemplary Configuration of Data Carousel Module]

FIG. 5 illustrates an example of data carousel modules storing sign language word image groups to be transmitted during the broadcast time of a television program X.

For example, if the sign language word images of the sign language words appearing in the speech in the television program X are grouped into three modules and repeatedly broadcast, the module A containing sign language word images corresponding to the sign language words A1, A2, ... that frequently appear in the television program X are transmitted more frequently than the modules B and C. It is assumed here that the modules B, C contain sign language word images corresponding to the sign language words B1, B2, ... and C1, C2, ... respectively that appear less frequently than the sign language word images A1, A2, ....

In this way, the sign language word images of the sign language words appearing in the speech in a television program are grouped into a plurality of modules and repeatedly transmitted at a frequency corresponding to the frequency of appearance of the sign language words, so the sign language word images can be transmitted more efficiently than would be when all the sign language word images are transmitted collectively. The receiving apparatus 13 in turn can immediately obtain and display the necessary sign language word images.

Figure 6:
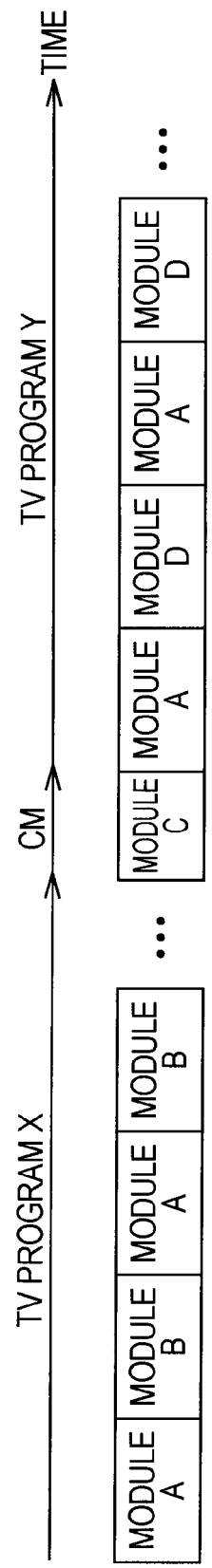
FIG. 6 illustrates an exemplary transmission sequence of data carousel modules.

As shown in FIG. 6, the same module A may be transmitted during the broadcast times of different television programs X, Y. More specifically, the modules A, B may be transmitted repeatedly during the broadcast time of television program X, the module C may be transmitted repeatedly during the broadcast time of CM, and the modules A, D may be transmitted repeatedly during the broadcast time of television program Y.

[Operation of Transmitting Apparatus in First Exemplary Configuration]

Figure 7:
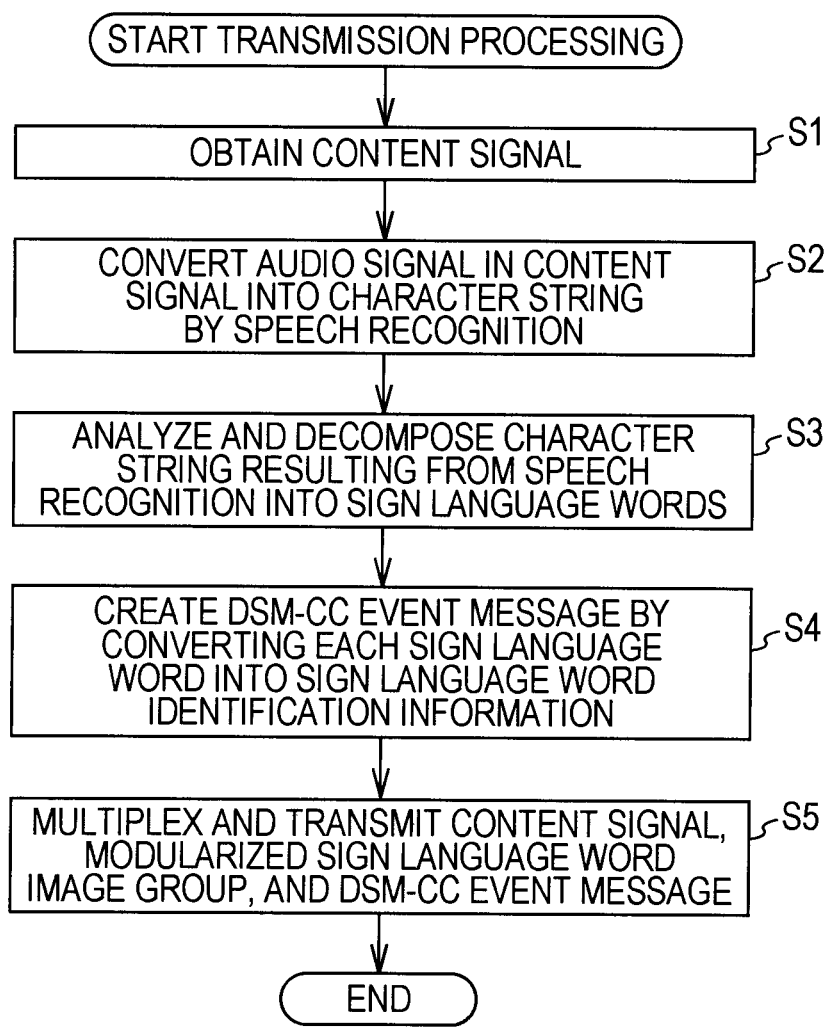
FIG. 7 is a flowchart illustrating a transmission process carried out by the transmitting apparatus in the first exemplary configuration.

FIG. 7 is a flowchart illustrating a transmission process carried out by the transmitting apparatus 11 in the first exemplary configuration.

In step S1, the transmitting apparatus 11 obtains a content signal from outside and inputs the content signal to the encoder 31 and the speech recognizer 32.

In step S2, the speech recognizer 32 converts the audio signal in the input content signal into a character string through a speech recognition process and outputs the character string to the sign language word analyzer 33.

In step S3, the sign language word analyzer 33 analyzes and decomposes the character string input from the speech recognizer 32 into sign language words and outputs these sign language words in the chronological order to the sign language word identification information converter 34.

In step S4, the sign language word identification information converter 34 converts the sign language words sequentially input from the sign language word analyzer 33 into sign language word identification information, and outputs the resultant sign language word identification information as a DSM-CC event message, synchronously with the corresponding speech, to the multiplexer 37.

While the processing in steps S2 to S4 is in progress, the encoder 31 encodes the input content signal according to the predetermined encoding scheme and outputs the encoded content signal to the multiplexer 37. The sign language word image sender 36 stores the sign language word image groups corresponding to the content into the data carousel modules for data broadcasting in the television broadcasting and repeatedly outputs the plurality of modules to the multiplexer 37 in the predetermined order.

In step S5, the multiplexer 37 combines the encoded content signal input from the encoder 31, the DSM-CC event message containing the chronologically-ordered sign language word identification information input from the sign language word identification information converter 34, and the data carousel modules storing the sign language word image groups input from the sign language word image sender 36, and outputs the resultant broadcast stream to the transmitter 38. The transmitter 38 broadcasts the broadcast stream input from the multiplexer 37 through the broadcasting network 12.

In the transmission process described above, the content signal and the signal for displaying the corresponding sign language video are broadcast. With this, the description of the transmission process carried out by the transmitting apparatus 11 in the first exemplary configuration is completed.

In the above transmission process carried out by the transmitting apparatus 11 in the first exemplary configuration, both the information for displaying the sign language video corresponding to the content, more specifically, chronologically-ordered ordered sign language word identification information, and the sign language word image groups can be broadcast using a data broadcasting scheme of existing technology.

[Second Exemplary Configuration of Broadcasting Equipment]

Figure 8:
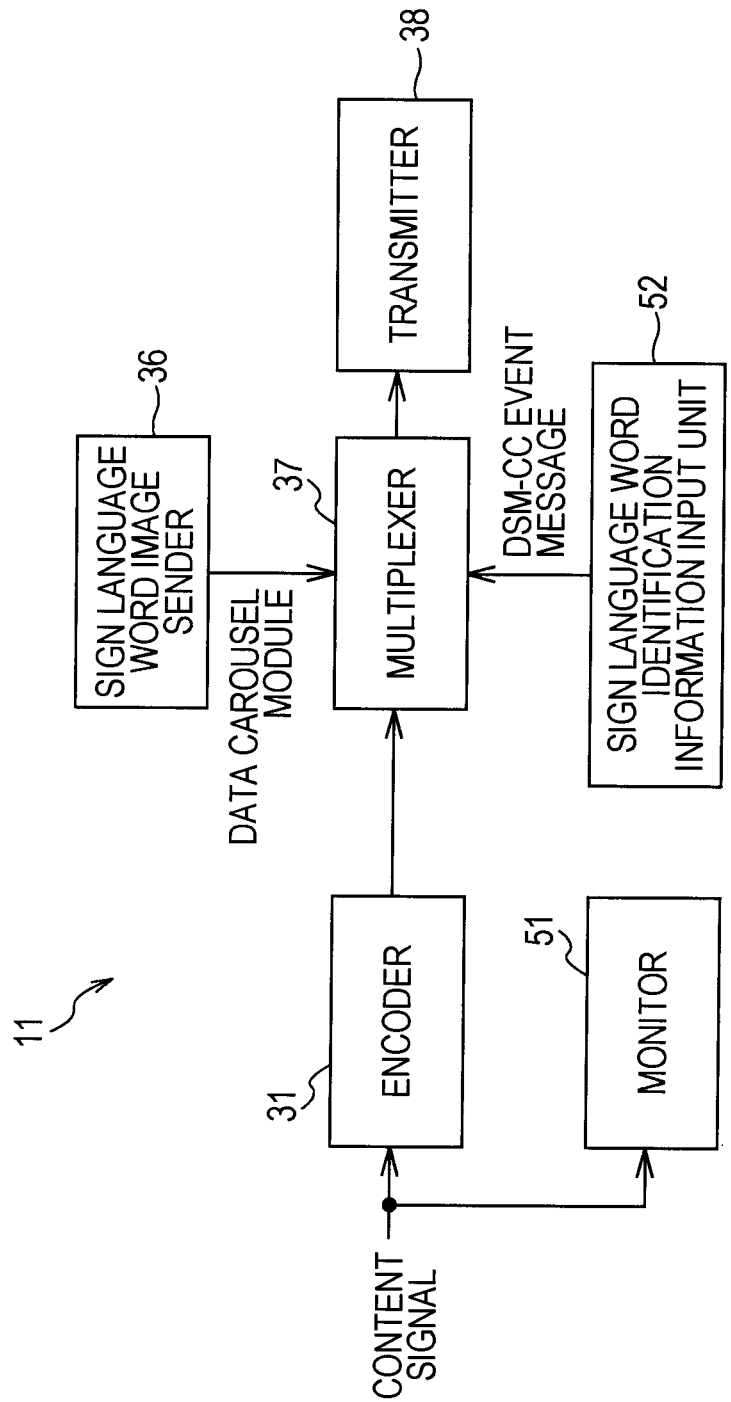
FIG. 8 is a block diagram showing a second exemplary configuration of the transmitting apparatus.

FIG. 8 illustrates a second exemplary configuration of the broadcasting apparatus 11. The broadcasting apparatus 11 in the second exemplary configuration does not include the speech recognizer 32, sign language word analyzer 33, sign language word identification information converter 34, and sign language word dictionary 35 included in the first exemplary configuration shown in FIG. 3 and instead includes a monitor 51 and a sign language word identification information input unit 52.

The components of the second exemplary configuration common to those of the first exemplary configuration are designated by the same reference characters and description thereof will be omitted.

In the second exemplary configuration, the monitor 51 displays a video and outputs a corresponding speech on the basis of a content signal input thereto. The operator of the broadcasting apparatus 11 operates the sign language word identification information input unit 52 while viewing the content on the monitor 51.

The sign language word identification information input unit 52 operated by the operator of the broadcasting apparatus 11 includes a keyboard having a plurality of keys corresponding to sign language words. When the operator viewing the content on the monitor 51 recognizes a sign language word in the speech and operates the key corresponding to the sign language word, the sign language word identification information input unit 52 generates sign language word identification information of the sign language word corresponding to the operated key and outputs the sign language word identification information as a DSM-CC event message to the multiplexer 37.

[Operation of Transmitting Apparatus in Second Exemplary Configuration]

Figure 9:
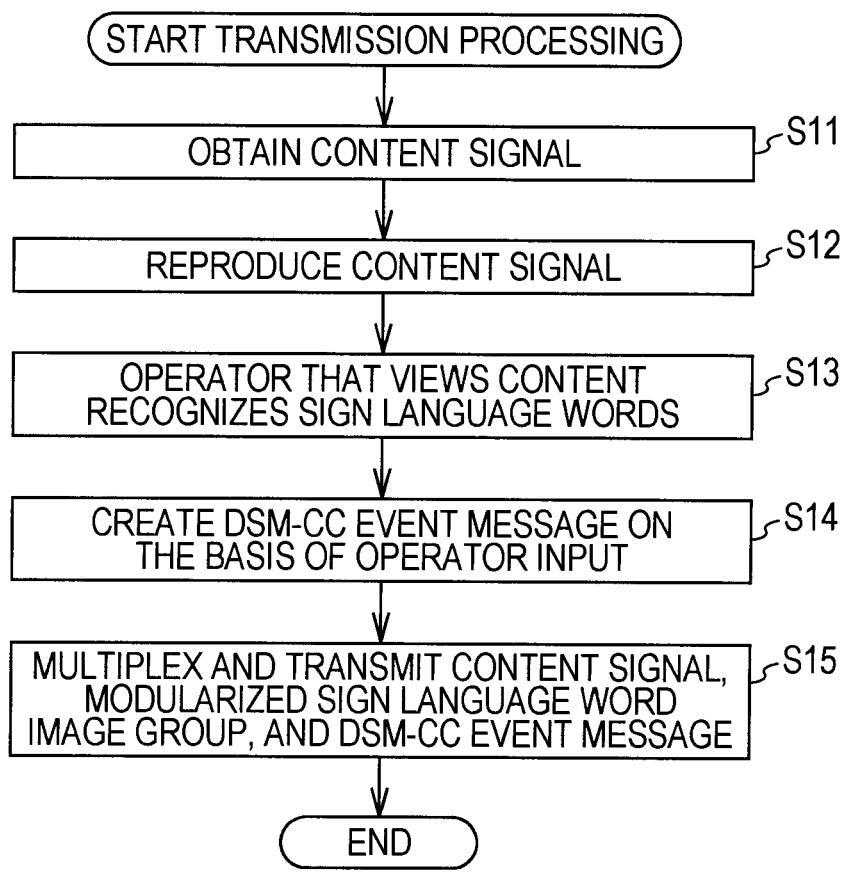
FIG. 9 is a flowchart illustrating a transmission process carried out by the transmitting apparatus in the second exemplary configuration.

FIG. 9 is a flowchart illustrating a transmission process carried out by the transmitting apparatus 11 in the second exemplary configuration.

In step S11, the transmitting apparatus 11 obtains a content signal from outside and inputs the content signal to the encoder 31 and the monitor 51.

In step S12, the monitor 51 reproduces the input content signal, displaying the video and outputting the speech.

In step S13, the operator viewing the content reproduced on the monitor 51 recognizes a sign language word appearing in the speech and operates the sign language word identification information input unit 52. In step S14, the sign language word identification information input unit 52 generates sign language word identification information of the sign language word corresponding to the key operated by the operator and outputs the generated sign language word identification information as a DSM-CC event message to the multiplexer 37.

While the processing in steps S12 to S14 is in progress, the encoder 31 encodes the input content signal according to the predetermined encoding scheme and outputs the encoded content signal to the multiplexer 37. The sign language word image sender 36 stores the sign language word image groups corresponding to the content into data carousel modules for data broadcasting in the television broadcasting and repeatedly outputs the plurality of modules to the multiplexer 37 in the predetermined order.

In step S15, the multiplexer 37 combines the encoded content signal input from the encoder 31, the DSM-CC event messages containing the chronologically-ordered sign language word identification information input from the sign language word identification information input unit 52, and the data carousel modules storing the sign language word image groups input from the sign language word image sender 36, and outputs the resultant broadcast stream to the transmitter 38. The transmitter 38 broadcasts the broadcast stream input from the multiplexer 37 through the broadcasting network 12.

In the transmission process described above, the content signal and the signal for displaying the corresponding sign language video are broadcast. With this, the description of the transmission process carried out by the transmitting apparatus 11 in the second exemplary configuration is completed.

In the above transmission process carried out by the transmitting apparatus 11 in the second exemplary configuration, both the information for displaying the sign language video corresponding to the content, more specifically, the chronologically-ordered ordered sign language word identification information, and the sign language word image groups can be broadcast using a data broadcasting scheme of existing technology.

In the transmission process described above, the sign language word image groups for displaying the sign language video corresponding to the content are repeatedly transmitted during the broadcast time of the content. Alternatively, the sign language word image groups may be transmitted before the corresponding content is broadcast.

[Exemplary Configuration of Receiving Apparatus]

Figure 10:
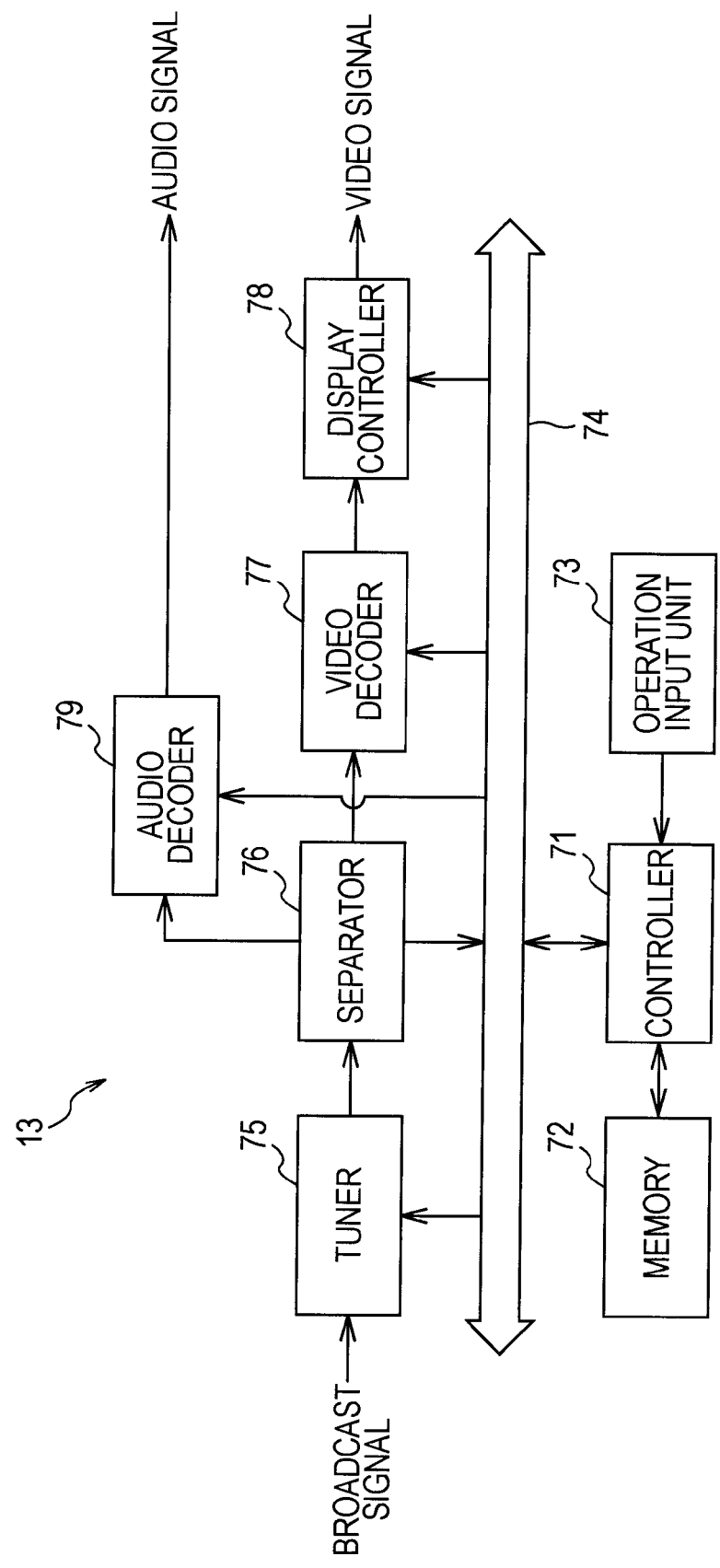
FIG. 10 is a block diagram showing an exemplary configuration of the receiving apparatus.

FIG. 10 illustrates an exemplary configuration of the receiving apparatus 13. The receiving apparatus 13 includes a controller 71, memory 72, operation input unit 73, bus 74, tuner 75, separator 76, video decoder 77, display controller 78, and audio decoder 79.

According to a control program stored in the memory 72, the controller 71 controls the components of the receiving apparatus 13 connected via the bus 74 in response to user operations. For example, the controller 71 controls the tuner 75 to receive a broadcast stream according to a channel selecting operation by the user.

The controller 71 also causes the sign language word image groups stored in the data carousel modules of the data signal extracted from the broadcast stream to be held in the memory 72. In addition, according to the DSM-CC event message extracted from the broadcast stream, the controller 71 causes the sign language word image groups stored in the data carousel modules being held in the memory 72 to be read out to the display controller 78 via the bus 74 and superimposed on the displayed content video.

The memory 72 stores the control program to be executed by the controller 71. The memory 72 also holds the sign language word image groups stored in the data carousel modules of the data broadcasting extracted from the broadcast stream.

The sign language word image groups stored in the data carousel modules are transmitted in units of each content and are usually deleted from the memory 72 when the content (television program) being received is changed or after the content is broadcast.

Alternatively, the sign language word images may remain in the memory 72 even when the content being received is changed or after the reception is completed, so that the sign language word images can be used for displaying the captions of a content to be broadcast later.

The operation input unit 73 generates operation signals in response to various operations input by the user (for example, channel-switching operations, and operation for displaying or hiding the sign language video) and outputs these signals to the controller 71 via the bus 74.

The tuner 75 receives and outputs the broadcast stream corresponding to the channel selection from the controller 71 to the separator 76. The separator 76 extracts a data signal (including a DSM-CC event message and data carousel modules) from the input broadcast stream and outputs the signal to the controller 71 via the bus 74. The separator 76 also extracts the encoded content signal from the input broadcast stream, separates the encoded content signal into the encoded video and audio signals, and outputs the encoded video signal to the video decoder 77 and the encoded audio signal to the audio decoder 79.

The video decoder 77 decodes the input encoded video signal and outputs the resultant content video signal to the display controller 78. The display controller 78, according to the control from the controller 71, combines the content video signal with the sign language word images as appropriate and outputs the combined signal to the subsequent stage.

The audio decoder 79 decodes the input encoded audio signal and outputs the resultant content audio signal to the subsequent stage.

[Operation of Receiving Apparatus]

Figure 11:
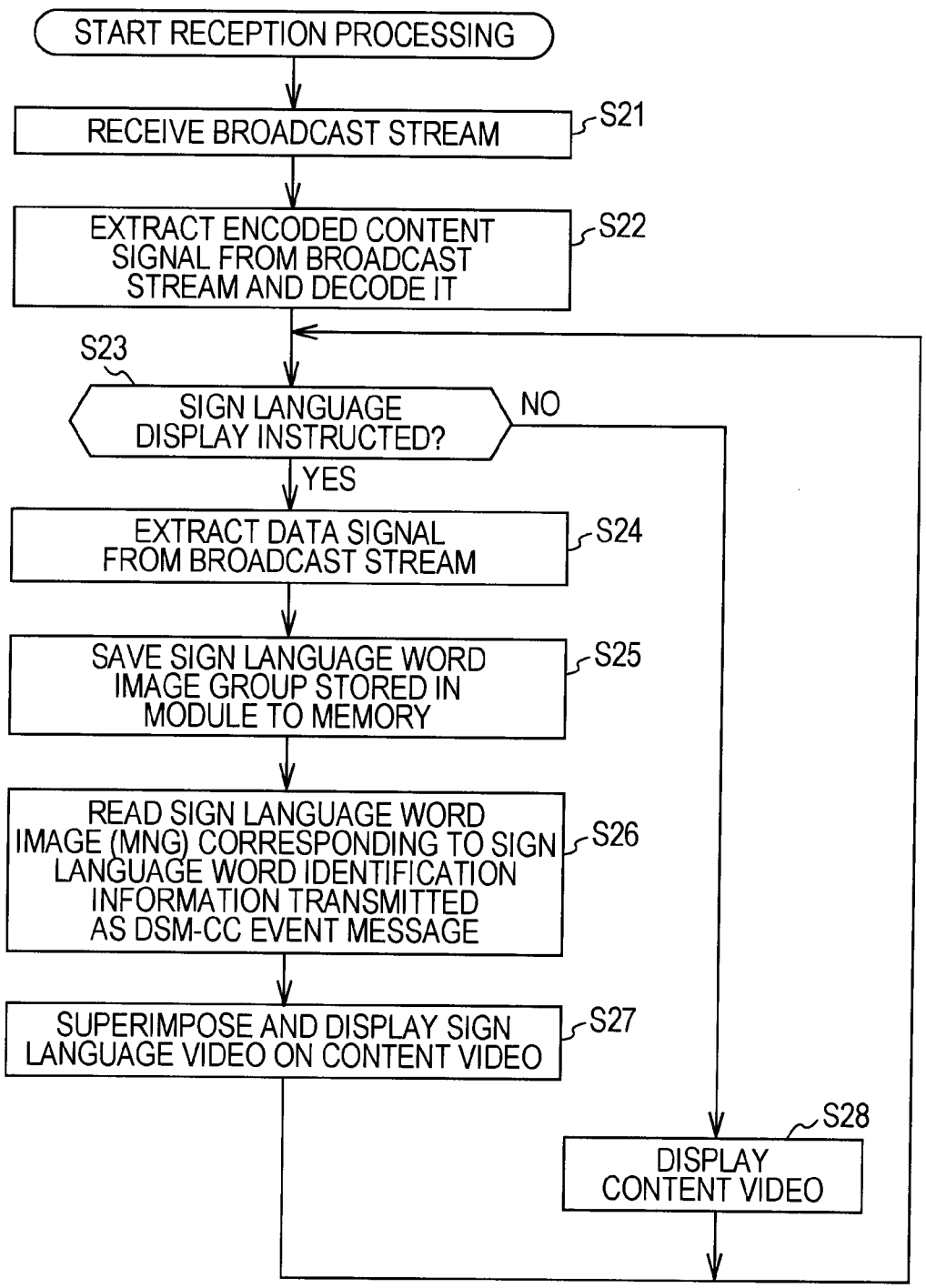
FIG. 11 is a flowchart illustrating a reception process carried out by the receiving apparatus.

FIG. 11 is a flowchart illustrating a reception process carried out by the receiving apparatus 13. This reception process starts upon power-on of the receiving apparatus 13 and is repeated until power-off.

In step S21, the tuner 75 starts receiving the broadcast stream corresponding to the channel selection from the controller 71 and outputs the received broadcast stream to the separator 76.

In step S22, the separator 76 extracts the encoded content signal from the input broadcast stream, separates the encoded content signal into the encoded video and audio signals, and outputs the encoded video signal to the video decoder 77 and the encoded audio signal to the audio decoder 79. The video decoder 77 decodes the input encoded video signal and outputs the resultant content video signal to the display controller 78. The audio decoder 79 decodes the input encoded audio signal and outputs the resultant content audio signal to the subsequent stage.

In step S23, the controller 71 determines, on the basis of the operation signal from the operation input unit 73, whether the user issued a command to display the sign language video. When it is determined that the command was issued, the process proceeds to step S24.

In step S24, the separator 76 extracts a data signal (including a DSM-CC event message and data carousel modules) from the input broadcast stream and outputs the data signal to the controller 71 via the bus 74. In step S25, the controller 71 causes the sign language word image groups stored in the data carousel modules of the data signal to be held by the memory 72.

In step S26, according to the DSM-CC event message contained in the data signal, the controller 71 reads out of the memory 72 the sign language word images in the MNG format corresponding to the sign language word identification information indicated by the message and outputs the sign language word images to the display controller 78 via the bus 74.

In step S27, the display controller 78, according to the control from the controller 71, creates a video signal for displaying the content video with the sign language video superimposed thereon by combining the content video signal with the sign language word images and outputs the created video signal to the subsequent stage. Then, the process returns to step S23 to repeat the subsequent processing.

When the user does not issue the command to display the sign language video or issues a command to hide the sign language video in step S23, the process proceeds to step S28. In step S28, the display controller 78, according to the control from the controller 71, outputs the content video signal alone to the subsequent stage. Then, the process returns to step S23 to repeat the subsequent processing.

With this, the description of the reception process is completed. In the above reception process, the sign language video is generated on the basis of the sign language word images in the MNG format stored in the data carousel modules, so decoding and other processing are unnecessary. Since the sign language video can be superimposed on the displayed content video using an existing function for displaying the video on the basis of the broadcast data, a significant burden is not imposed on the receiving apparatus 13.

It should be noted that the embodiments of the present invention are applicable not only to the broadcasting systems that broadcast contents to a plurality of receiving apparatuses, but also to the broadcasting systems that supply contents in response to requests from receiving apparatuses.

The series of processing steps described above can be carried out by hardware or software.

The computer program executed by the computer may be a program that is sequentially executed in the time order described in this specification or a program that is executed in parallel or executed when necessary such as when called.

Furthermore, the computer program may be a program that is executed by a single computer or a program distributed among and executed by a plurality of computers. Furthermore, the computer program may be transferred to and executed by a remote computer.

The system as referred to in this specification represents the whole equipment including a plurality of apparatuses.

The embodiments of the present invention are not limited to the above embodiments and can be variously modified without departing from the spirit of the invention.

The present application contains subject matter related to that disclosed in Japanese Priority Patent Application JP 2009-243442 filed in the Japan Patent Office on Oct. 22, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A transmitting apparatus configured to transmit a content, the apparatus comprising:
    encoding means for creating an encoded content signal by encoding the content;
    generating means for generating sign language word identification information corresponding to chronologically-ordered sign language words appearing in a speech in the content;
    creating means for creating control information containing the generated chronologically-ordered sign language word identification information;
    storing means for storing sign language word images for displaying a sign language video corresponding to the sign language words by grouping the sign language word images into a plurality of modules according to a frequency of appearance of the sign language words in the speech in the content;
    multiplexing means for creating a data stream by combining the encoded content signal with the control information and by repeatedly replicating the plurality of modules at a frequency corresponding to the frequency of appearance; and
    transmitting means for transmitting the created data stream.

2. The transmitting apparatus according to claim 1, wherein the creating means generates a DSM-CC event message as control information including the generated chronologically-ordered sign language word identification information;
    wherein the storing means stores the sign language word images for displaying the sign language video corresponding to the sign language words by grouping the sign language word images into a plurality of DSM-CC data carousel modules according to a frequency of appearance of the sign language words in the speech in the content.

3. The transmitting apparatus according to claim 2, the generating means comprising:
    speech recognizing means for converting the speech in the content into a character string through a speech recognition process;
    detecting means for detecting the sign language words in the character string; and
    converting means for converting the detected sign language words into the sign language word identification information.

4. The transmitting apparatus according to claim 2, further comprising:
    operation input means operated by an operator viewing the content and recognizing the sign language words in the speech in the content;
    wherein the generating means generates the sign language word identification information corresponding to the chronologically-ordered sign language words appearing in the speech in the content, on the basis of an input by the operator to the operation input means.

5. The transmitting apparatus according to any one of claims 2 to 4, wherein the multiplexing means replicates the plurality of modules storing common sign language word images corresponding to sign language words frequently appearing in speeches of different contents for the encoded content signals corresponding to the different contents.

6. The transmitting apparatus according to claim 2, wherein the sign language word images are in a multiple-image network graphics, portable network graphics, or joint photographic experts group format.

7. A transmitting method of a transmitting apparatus configured to transmit a content, the method comprising the steps of:
    creating an encoded content signal by encoding the content;
    generating sign language word identification information corresponding to chronologically-ordered sign language words appearing in a speech in the content;
    creating control information containing the generated chronologically-ordered sign language word identification information;
    storing sign language word images for displaying a sign language video corresponding to the sign language words by grouping the sign language word images into a plurality of modules according to a frequency of appearance of the sign language words in the speech in the content;

creating a data stream by combining the encoded content signal with the control information and by repeatedly replicating the plurality of modules at a frequency corresponding to the frequency of appearance; and transmitting the created data stream.

8. A computer program for controlling a transmitting apparatus configured to transmit a content by causing a computer in the transmitting apparatus to execute a process, the process comprising the steps of:

creating an encoded content signal by encoding the content;

generating sign language word identification information corresponding to chronologically-ordered sign language words appearing in a speech in the content;

creating control information containing the generated chronologically-ordered sign language word identification information;

storing sign language word images for displaying a sign language video corresponding to the sign language words by grouping the sign language word images into a plurality of modules according to a frequency of appearance of the sign language words in the speech in the content;

creating a data stream by combining the encoded content signal with the control information and by repeatedly replicating the plurality of modules at a frequency corresponding to the frequency of appearance; and transmitting the created data stream.

9. A receiving apparatus configured to receive a content transmitted from a transmitting apparatus, the transmitting apparatus including encoding means for creating an encoded content signal by encoding the content, generating means for generating sign language word identification information corresponding to chronologically-ordered sign language words appearing in a speech in the content, creating means for creating control information containing the generated chronologically-ordered sign language word identification information, storing means for storing sign language word images for displaying a sign language video corresponding to the sign language words by grouping the sign language word images into a plurality of modules according to a frequency of appearance of the sign language words in the speech in the content, multiplexing means for creating a data stream by combining the encoded content signal with the control information and by repeatedly replicating the plurality of modules at a frequency corresponding to the frequency of appearance, and transmitting means for transmitting the created data stream;

the receiving apparatus comprising:

receiving means for receiving the data stream transmitted from the transmitting apparatus;

separating means for separating the received data stream into the encoded content signal, the control information, and the plurality of modules;

decoding means for reproducing video and audio signals of the content by decoding the encoded content signal separated from the data stream;

holding means for holding sign language word images for displaying a video corresponding to the sign language words stored in the plurality of modules separated from the data stream;

reading means for reading out of the sign language word images being held the sign language word images corresponding to the chronologically-ordered sign language word identification information contained in the control information separated from the data stream; and display controlling means for superimposing the sign language video based on the read sign language word images on the displayed content video based on the reproduced content video signal.

10. A receiving method of a receiving apparatus configured to receive a content transmitted from a transmitting apparatus, the transmitting apparatus including encoding means for creating an encoded content signal by encoding the content, generating means for generating sign language word identification information corresponding to chronologically-ordered sign language words appearing in a speech in the content, creating means for creating control information containing the generated chronologically-ordered sign language word identification information, storing means for storing sign language word images for displaying a sign language video corresponding to the sign language words by grouping the sign language word images into a plurality of modules according to a frequency of appearance of the sign language words in the speech in the content, multiplexing means for creating a data stream by combining the encoded content signal with the control information and by repeatedly replicating the plurality of modules at a frequency corresponding to the frequency of appearance, and transmitting means for transmitting the created data stream;

the receiving method comprising the steps of:

receiving the data stream transmitted from the transmitting apparatus;

separating the received data stream into the encoded content signal, the control information, and the plurality of modules;

reproducing video and audio signals of the content by decoding the encoded content signal separated from the data stream;

holding sign language word images for displaying a video corresponding to the sign language words stored in the plurality of modules separated from the data stream;

reading out of the sign language word images being held the sign language word images corresponding to the chronologically-ordered sign language word identification information contained in the control information separated from the data stream; and superimposing the sign language video based on the read sign language word images on the displayed content video based on the reproduced content video signal.

11. A computer program for controlling a receiving apparatus configured to receive a content transmitted from a transmitting apparatus by causing a computer in the receiving apparatus to carry out a process, the transmitting apparatus including encoding means for creating an encoded content signal by encoding the content, generating means for generating sign language word identification information corresponding to chronologically-ordered sign language words appearing in a speech in the content, creating means for creating control information containing the generated chronologically-ordered sign language word identification information, storing means for storing sign language word images for displaying a sign language video corresponding to the sign language words by grouping the sign language word images into a plurality of modules according to a frequency of appearance of the sign language words in the speech in the content, multiplexing means for creating a data stream by combining the encoded content signal with the control information and by repeatedly replicating the plurality of modules at a frequency corresponding to the frequency of appearance, and transmitting means for transmitting the created data stream;

the process comprising the steps of:

receiving the data stream transmitted from the transmitting apparatus;

separating the received data stream into the encoded content signal, the control information, and the plurality of modules;

reproducing video and audio signals of the content by decoding the encoded content signal separated from the data stream;

holding sign language word images for displaying a video corresponding to the sign language words stored in the plurality of modules separated from the data stream;

reading out of the sign language word images being held the sign language word images corresponding to the chronologically-ordered sign language word identification information contained in the control information separated from the data stream; and superimposing the sign language video based on the read sign language word images on the displayed content video based on the reproduced content video signal.

12. A broadcasting system comprising a transmitting apparatus configured to transmit a content and a receiving apparatus configured to receive the transmitted content, the transmitting apparatus including encoding means for creating an encoded content signal by encoding the content, generating means for generating sign language word identification information corresponding to chronologically-ordered sign language words appearing in a speech in the content, creating means for creating control information containing the generated chronologically-ordered sign language word identification information, storing means for storing sign language word images for displaying a sign language video corresponding to the sign language words by grouping the sign language word images into a plurality of modules according to a frequency of appearance of the sign language words in the speech in the content, multiplexing means for creating a data stream by combining the encoded content signal with the control information and by repeatedly replicating the plurality of modules at a frequency corresponding to the frequency of appearance, and transmitting means for transmitting the created data stream;

the receiving apparatus including receiving means for receiving the data stream transmitted from the transmitting apparatus, separating means for separating the received data stream into the encoded content signal, the control information, and the plurality of modules, decoding means for reproducing video and audio signals of the content by decoding the encoded content signal separated from the data stream, holding means for holding sign language word images for displaying a video corresponding to the sign language words stored in the plurality of modules separated from the data stream, reading means for reading out of the sign language word images being held the sign language word images corresponding to the chronologically-ordered sign language word identification information contained in the control information separated from the data stream, and display controlling means for superimposing the sign language video based on the read sign language word images on the displayed content video based on the reproduced content video signal.

13. A transmitting apparatus configured to transmit a content, the apparatus comprising:

an encoder creating an encoded content signal by encoding the content;

a generator generating sign language word identification information corresponding to chronologically-ordered sign language words appearing in a speech in the content;

a creating unit creating control information containing the generated chronologically-ordered sign language word identification information;

a storage unit storing sign language word images for displaying a sign language video corresponding to the sign language words by grouping the sign language word images into a plurality of modules according to a frequency of appearance of the sign language words in the speech in the content;

a multiplexer creating a data stream by combining the encoded content signal with the control information and by repeatedly replicating the plurality of modules at a frequency corresponding to the frequency of appearance; and a transmitter transmitting the created data stream.

14. A receiving apparatus configured to receive a content transmitted from a transmitting apparatus, the transmitting apparatus including an encoder creating an encoded content signal by encoding the content, a generator generating sign language word identification information corresponding to chronologically-ordered sign language words appearing in a speech in the content, a creating unit creating control information containing the generated chronologically-ordered sign language word identification information, a storage unit storing sign language word images for displaying a sign language video corresponding to the sign language words by grouping the sign language word images into a plurality of modules according to a frequency of appearance of the sign language words in the speech in the content, a multiplexer creating a data stream by combining the encoded content signal with the control information and by repeatedly replicating the plurality of modules at a frequency corresponding to the frequency of appearance, and a transmitter transmitting the created data stream;

the receiving apparatus comprising:

a receiver receiving the data stream transmitted from the transmitting apparatus;

a separator separating the received data stream into the encoded content signal, the control information, and the plurality of modules;

a decoder reproducing video and audio signals of the content by decoding the encoded content signal separated from the data stream;

a holding unit holding sign language word images for displaying a video corresponding to the sign language words stored in the plurality of modules separated from the data stream;

a reading unit reading out of the sign language word images being held the sign language word images corresponding to the chronologically-ordered sign language word identification information contained in the control information separated from the data stream; and a display controller superimposing the sign language video based on the read sign language word images on the displayed content video based on the reproduced content video signal.

15. The transmitting apparatus according to claim 3, wherein the sign language word images are in a multiple-image network graphics, portable network graphics, or joint photographic experts group format.

16. The transmitting apparatus according to claim 4, wherein the sign language word images are in a multiple-image network graphics, portable network graphics, or joint photographic experts group format.

17. The transmitting apparatus according to claim 5, wherein the sign language word images are in a multiple-image network graphics, portable network graphics, or joint photographic experts group format.

* * * * *